J. L. SHEPPARD.
APPARATUS FOR RESHAPING AND COMPRESSING PLANTATION COTTON BALES.
APPLICATION FILED FEB. 11, 1914.
1,121,571.
Patented Dec. 15, 1914.
4 SHEETS—SHEET 1.
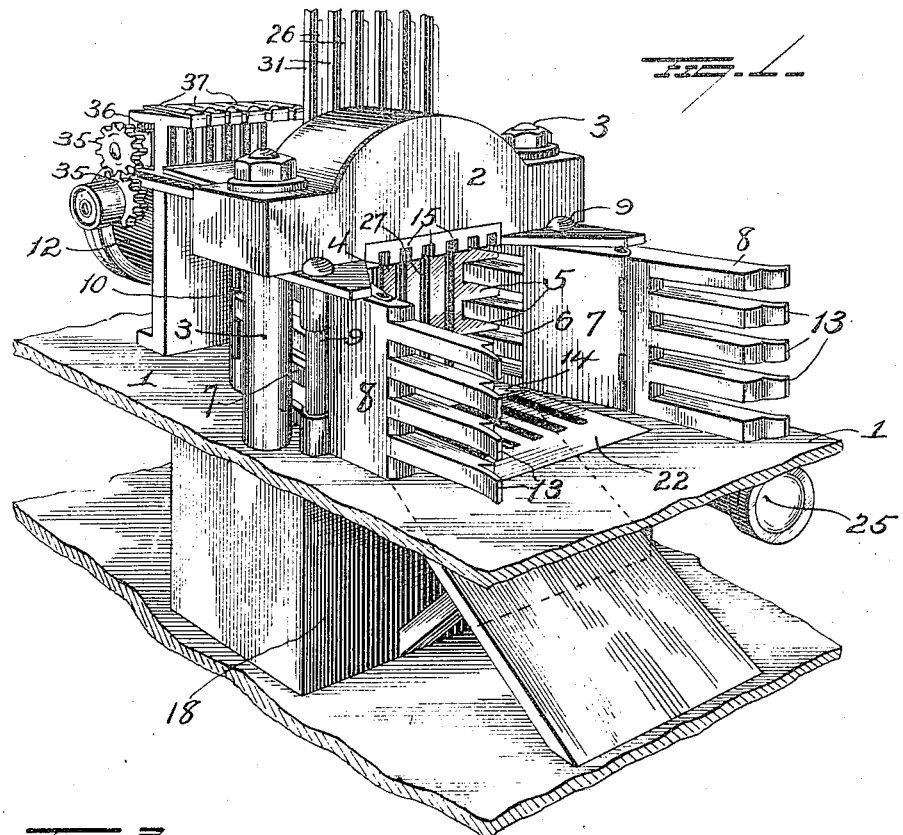
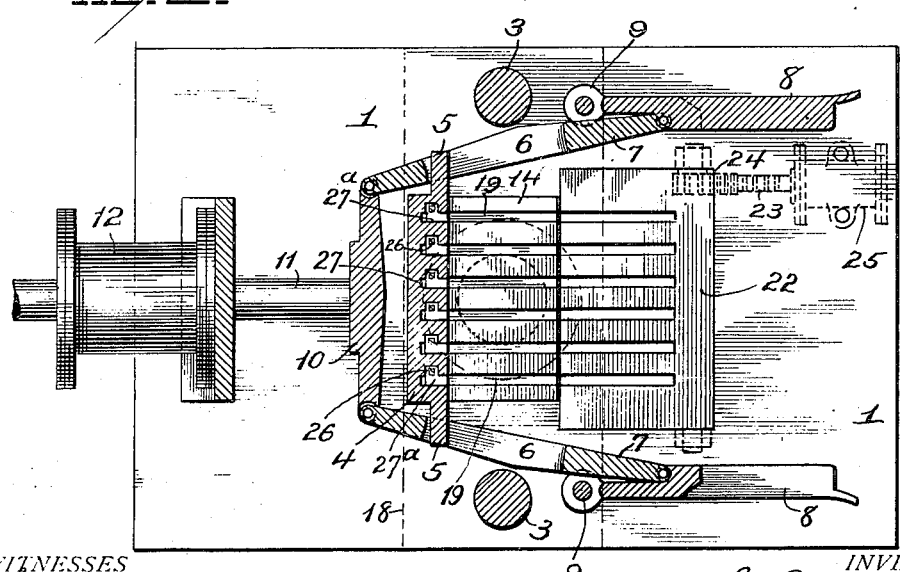
WITNESSES
E. J. Nottingham
G. F. Downing
INVENTOR
J. L. Sheppard
By H. A. Seymour
Attorney J. L. SHEPPARD.
APPARATUS FOR RESHAPING AND COMPRESSING PLANTATION COTTON BALES.
APPLICATION FILED FEB. 11, 1914.
1,121,571.
Patented Dec. 15, 1914.
4 SHEETS—SHEET 2.
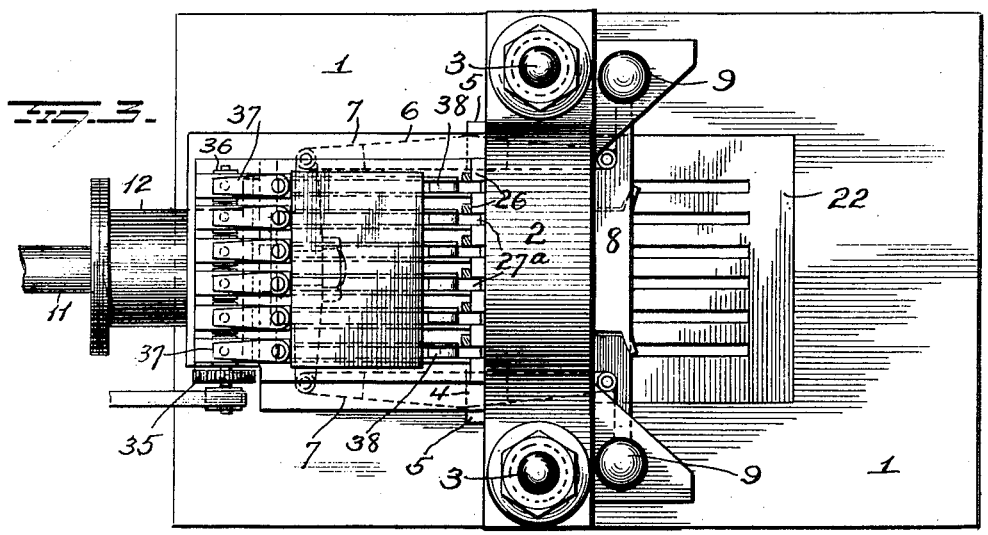
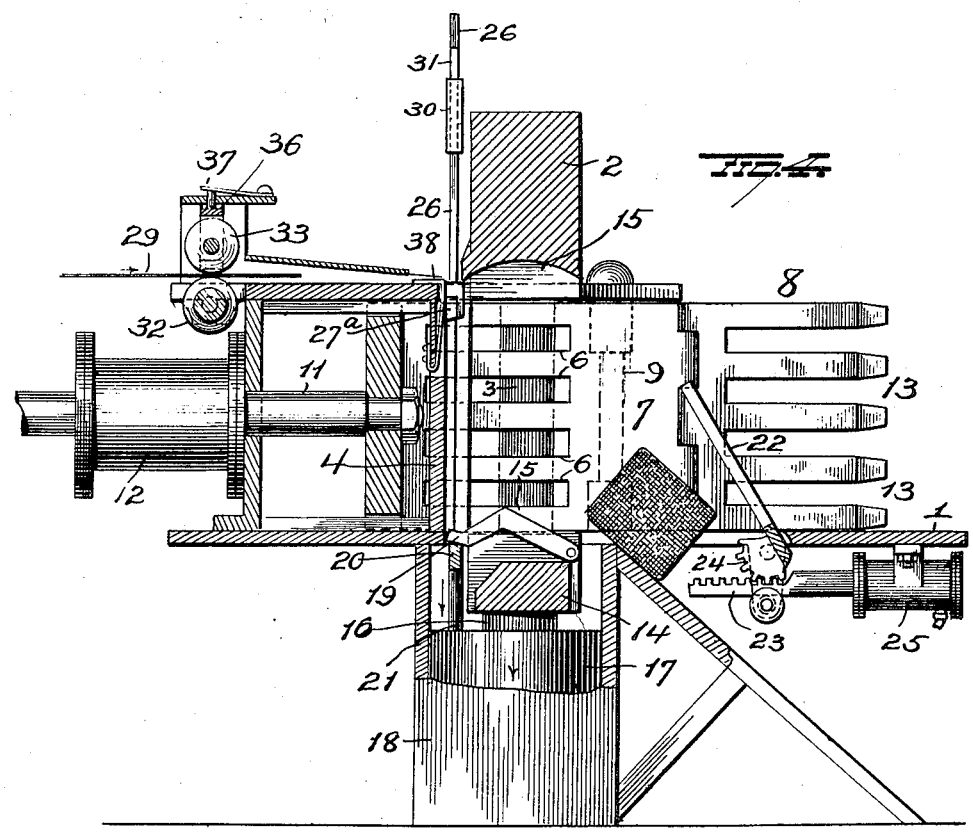

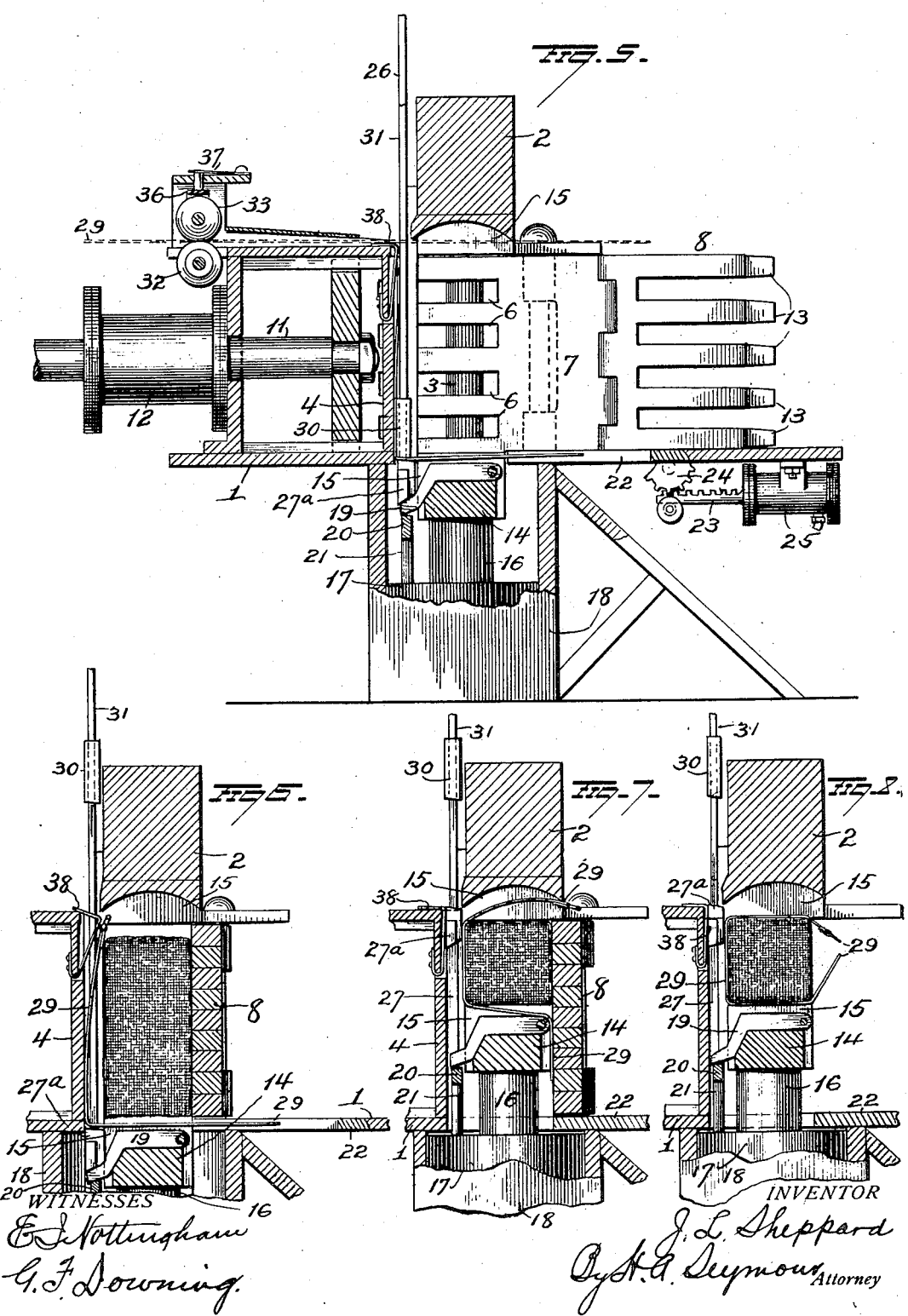

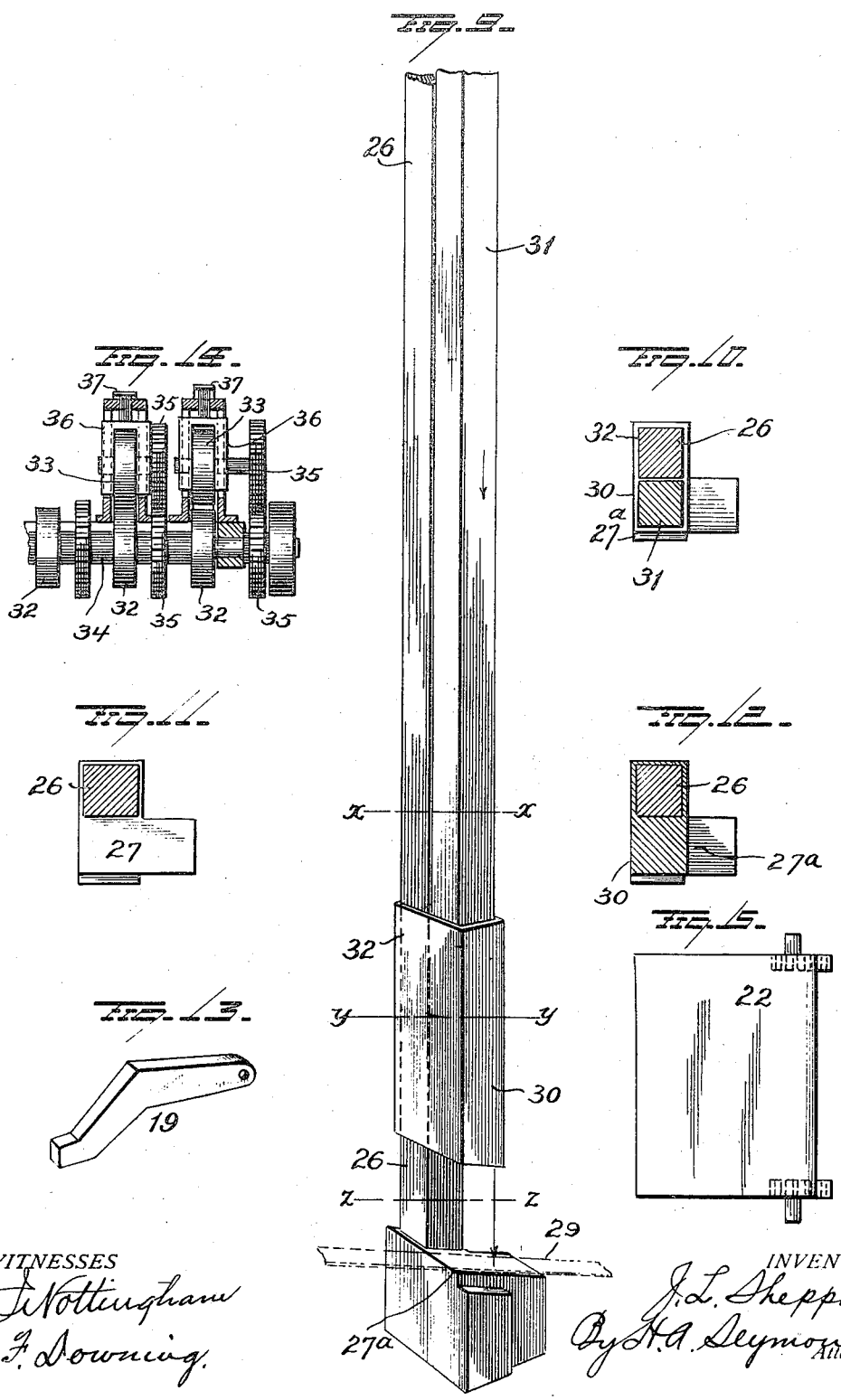

UNITED STATES PATENT OFFICE.

JOHN L. SHEPPARD, OF CHARLESTON, SOUTH CAROLINA, ASSIGNOR TO AMERICAN HIGH DENSITY COMPRESS CORPORATION, A CORPORATION OF SOUTH CAROLINA.

APPARATUS FOR RESHAPING AND COMPRESSING PLANTATION COTTON-BALES.

1,121,571. Specification of Letters Patent. Patented Dec. 15, 1914.

Application filed February 11, 1914. Serial No. 818,121.

*To all whom it may concern:*

Be it known that I, JOHN L. SHEPPARD, of Charleston, in the county of Charleston and State of South Carolina, have invented certain new and useful Improvements in Apparatus for Reshaping and Compressing Plantation Cotton-Bales; and I do hereby declare the following to be a full, clear, and exact description of the invention, such as will enable others skilled in the art to which it appertains to make and use the same.

My invention relates to an improvement in apparatus for reshaping and compressing plantation cotton bales, the object being to provide an apparatus adapted to receive and reshape a plantation cotton bale, and after the bale has been reshaped, to compress the same without removing it from the reshaping chamber.

A further object is to provide an apparatus in which a plantation cotton bale is first subjected to end and side wise pressure to reshape it and then compressed in a direction at right angles to the reshaping pressure, without removing it from the reshaping chamber.

A further object is to provide an apparatus having movable members for reducing the length and width of a bale, and a compression member for reducing the thickness of the bale while it is held under compression by the movable reshaping members.

With these and other objects in view my invention consists in the parts and combination of parts and in the details of construction as will be more fully described and pointed out in the claims.

In the accompanying drawings, Figure 1 is a view in perspective of an apparatus embodying my invention; Fig. 2 is a view in horizontal section of the same; Fig. 3 is a view in plan; Fig. 4 is a view in vertical longitudinal section showing the parts after the bale has been compressed, and while being ejected from the compress; Fig. 5 is a view in section showing the bale tie in place and the parts ready to receive a plantation cotton bale; Fig. 6 shows the bale reshaped and prior to compression; Fig. 7 shows the bale compressed; Fig. 8 is a similar view showing a bale compressed and the jaws open exposing the free ends of the bands for tying; Fig. 9 is a view in perspective of the means for carrying the bale band to the bottom of the compress chamber; Figs. 10, 11 and 12 are views respectively on the lines x—x; y—y and z—z of Fig. 9; Fig. 13 is a view of one of the levers for ejecting the bale; Fig. 14 is a view in section partly in elevation of the mechanism for feeding the bale bands to the compress chamber, and Fig. 15 is a view in plan of a modified form of the tilting platform.

My apparatus comprises a floor 1, having an opening thereon, and a top platen 2 located immediately over said opening and rigidly secured to the posts 3, the latter preferably extending down to the foundation of the apparatus and firmly secured in place. A rear wall 4 located in a plane between the posts 3, extends from the floor up to approximately the lower face of the platen 2, in a vertical plane just at the rear of the latter, and is provided at each end with a series of horizontal integral parallel fingers 5, which rest in correspondingly located slots 6 in the end jaws 7, and operate to approximately close the space between the rear wall and end jaws when the latter are open and also when closed, without interfering in the slightest with the free opening and closing movements of the jaws.

The end jaws 7 are pivotally connected at their front end to the gates 8 which latter are mounted to turn on the posts 9, the pivotal connection between the jaws and gates being in advance of the posts 9, as shown in Fig. 2, and they are pivotally connected at their rear ends to the cross head 10, rigidly secured to the plunger 11, which is actuated by the hydraulic cylinder 12 in the usual and well known manner. These jaws and gates are in a horizontal plane intermediate the floor 1 and the platen 2, and the jaws are in vertical planes beyond the ends of the opening in the floor so that when the gates and jaws are in their closed position, they will form a rectangular compartment registering with the opening in the floor 1. The gates 8 are slotted at their free ends, as shown in Fig. 1, to form intermeshing fingers 13, which, when the gates are closed, interlock so as to completely close the compress chamber and prevent any bulging of the cotton at the front.

Located in the vertical plane of the opening in floor 1, and normally flush with the surface of the latter is the compress platen 14. The upper fixed platen, and also the lower platen are grooved, as at 15, for the passage of the bale bands, and the lower platen 14 is carried on plunger 16, which latter is mounted, and moves in the larger plunger 17, mounted in hydraulic cylinder 18, the said plungers 16 and 17 operating in the usual and well known manner to lift platen 14 to compress the bale.

Mounted in grooves 15 of the movable platen 14, are the ejector levers 19, pivoted at the front ends to said platen, and projecting at their rear ends behind the platen. The rear ends of these levers rest over the cross head 20 carried by the rod 21, which latter is secured to the upper face of the larger plunger 17.

22 is a tilting platform located within an opening in the floor 1 in advance of the platen 14, and is lifted or tilted by the rack on plunger 23 engaging the segmental pinion 24 fast to the shaft to which the platform is secured. The plunger 23 is actuated by hydraulic cylinder 25, and operates to lift the platform from the position shown in Figs. 1, 2 and 5, to that shown in Fig. 4. When lowered the platform is supported at its free end, as shown in Fig. 5. This platform may be grooved to receive the free ends of the bale bands as shown in Figs. 5 and 6, but I prefer to make it without grooves as shown in Fig. 15. When made without grooves, the free ends of the bands pass under the platform and are held out of the way by the latter, consequently are not in a position to be engaged by the cotton or bagging protruding from the plantation bale, during the operation of placing the plantation bale in the reshaping and compressing chamber.

26 are a series of rods, one for each bale band, mounted in recesses 27 formed in the rear wall 4 of the compress. These recesses extend throughout the length of the wall and are open at both ends, and at their fronts, as shown in Fig. 2, for the passage of the bale bands as will be hereinafter explained. Each rod 26 is provided at its lower end with a foot 27$^a$, over which the bale bands 29 are fed during the initial feeding movement of the bands, and on which they are held during the movement of the band down to the bottom of the compress chamber, by the weighted drivers 30, one for each rod. Each driver is secured to the lower end of a rod 31, and in the present instance each is provided with a sleeve 32, which embraces its rod 26 and holds the driver in its proper relation to the foot 27$^a$. The rods 26 and drivers 30, may be actuated by the devices disclosed in my pending application No. 771,273, filed June 2nd, 1913, or by any other suitable mechanism to raise and lower them at the proper time.

The bale bands are fed into the compress by the feed rollers 32 and 33 shown in Fig. 14. The rollers 32 are secured to a positively rotated shaft 34, and rollers 33 are preferably each secured to a short shaft driven by the intermeshing gear wheels 35, each short shaft being mounted in a movable bearing 36, which is yieldingly forced downwardly by the springs 37.

At the commencement of the operation, the gates and end jaws are in the open position, as shown in Figs. 1 and 2, and the rods 26 elevated so as to bring their feet 27$^a$ approximately in the line of the lower edge of the top platen 2 as shown in Fig. 7. The bale band feeding rolls 32 are then rotated, and the bands 29 are fed forwardly over the feet 27$^a$ and into and through the grooves 15 in the upper platen 2. After the buckles on the bands have passed between the feed rollers 32—33, the bands come to a stop, and by now dropping the drivers 30 onto the bands and lowering the rods 26 and 31, the bale bands will be carried by the descending feet and drivers to the position shown in Fig. 6, and the compress is now ready to receive the plantation cotton bale. After the plantation bale has been placed between the platens 2 and 14 the plunger 11 is moved rearwardly carrying with it the cross head 10, which pulls the end jaws 7 rearwardly, and as the latter are pivotally connected with the gates 8 in advance of the pivots 9 of the latter, the gates will be closed simultaneously with the rearward movement of the end jaws. This closing movement of the gates also produces a closing movement of the end jaws, which movements operate to reduce and shape the bale, as to length and width, to the size of the final compressed bale. Prior to the placement of the bale in the compress chamber, the bands that were on the plantation bale are cut and removed thus leaving the cotton and its inclosing bagging free to conform to the shape of the compress chamber. After the plantation bale has been properly entered and the jaws and gates closed, as in Fig. 6, plunger 16 carrying lower platen 14 is elevated to apply the initial compression to the bale, after which the larger plunger 17 carrying plunger or ram 16, is raised to complete the compression. After the bale has been fully compressed, as in Fig. 7, the gates 8 are opened, thus exposing the free ends of the bands which are then brought together and fastened in the well known manner. It has been found in actual practice that the expansion of a cotton bale is in the direction of the last pressure, hence after the bale has been compressed, there is no expansion thereof either at the front, rear or ends after the front gates have been opened. As the bale is forced upwardly by the plungers 16 and 17, the buckle ends of the bands 29 engaging the spring deflectors 38 are forced inwardly under the concave roofs of the grooves 15, as shown in Fig. 7, and as the bale is compressed, the buckle ends of the bands are guided by these curved roofs through the grooves to the front thereof as shown in Fig. 7. After the bands have been tied or locked to the buckles the pressure against plunger on ram 16 is relieved, thus permitting the latter to descend, but, as the free rear ends of the levers 19 are resting on cross head 20 carried by the rod 21, they will be retained against downward movement, while the front ends will be lowered as shown in Fig. 4, so as to tilt the levers and discharge the bale at the front. Prior to the discharge of the bale the platform 22 is thrown upwardly, thus permitting the compressed bale to be discharged onto the incline where it gravitates to the floor below. During the operation of discharging the bale, the bands for the next bale are fed into place and after the bale has been ejected, the platform 22 is dropped to its closed position and the apparatus is ready for the next bale.

With this improvement there is no handling of the bale between the steps of reshaping and compressing, and plantation bales of any size and shape may be reshaped and compressed to uniform length and width without any rehandling. The parts are compact and strong and the construction is such that when the jaws and gates are closed they form a compress box as rigid and as strong as the ordinary compress box, hence any degree of density obtainable in the ordinary compress may be safely attained with my apparatus.

It is evident that many slight changes might be resorted to in the relative arrangement of parts shown and described without departing from the spirit and scope of my invention. Hence I would have it understood that I do not wish to confine myself to the exact construction and arrangement of parts shown and described but, Having fully described my invention what I claim as new and desire to secure by Letters Patent, is:—

1. In apparatus for reshaping and compressing plantation cotton bales, the combination of a compress box composed of a fixed rear wall, and movable ends and a front adapted to be closed onto the plantation bale for reshaping the same, and a compress platen forming the bottom of said box and adapted to be moved up into the same for compressing the reshaped bale.

2. In apparatus for reshaping and compressing plantation cotton bales, the combination of a compress box having a fixed rear wall and movable front and end walls, means for closing said movable walls onto a bale whereby the latter will be reshaped as to length and width and a compress plunger movable within said box for compressing the reshaped bale.

3. In apparatus for reshaping and compressing plantation cotton bales, the combination of a compress box having a fixed rear member and movable front and end members for reducing a bale in two dimensions and a platen movable within the space between said movable member for reducing the bale in its other dimension.

4. In apparatus for reshaping and compressing plantation cotton bales, the combination of a fixed rear wall, movable end jaws, front gates, means for opening and closing said jaws and gates, and a compressing plunger adapted to move in the space inclosed by said jaws and gates.

5. In apparatus for reshaping and compressing plantation cotton bales, the combination of a fixed rear wall, movable end jaws, front gates pivotally connected to the jaws, means for opening and closing said jaws and gates, a fixed platen in a plane above said gates and jaws, and a movable compress platen adapted to move upwardly into the space between the jaws and gates.

6. In apparatus for reshaping and compressing plantation cotton bales, the combination of movable end jaws and front gates, fixed rear wall and fixed upper platen, means for feeding bands to the space between said parts, and an upwardly movable plunger for compressing the bale.

7. In apparatus for reshaping and compressing plantation cotton bales, the combination of pivoted front gates, end jaws hinged to the gates in advance of the pivots of the latter and adapted to move toward each other as the gates move to closing position, means for opening and closing said jaws and gates, a fixed platen above said parts and a platen movable up into the space between said parts.

8. In apparatus for reshaping and compressing plantation cotton bales, the combination of pivoted front gates, side jaws hinged to the gates in advance of the pivots of the latter, means for opening and closing said jaws and gates, a fixed rear wall, a fixed platen and a platen adapted to move up into the space between said parts.

9. In apparatus for reshaping and compressing plantation cotton bales, the combination of a fixed top platen, and rear wall, movable end jaws and front gates, means for opening and closing said jaws and gates, a platen adapted to move within the space inclosed by said fixed and movable parts and means for automatically introducing the bale bands into the chamber inclosed by said parts.

10. In apparatus for reshaping and compressing plantation cotton bales, the combination with a press chamber, movable and fixed platens, means for feeding bale bands into the press chamber adjacent the fixed platen and means for carrying said bands down to rest adjacent the movable platen.

11. In apparatus for reshaping and compressing plantation cotton bales, the combination of a fixed platen, a movable platen, fixed rear wall, movable end jaws and front gate, and ejectors carried by the movable platen for ejecting the bale during the descent of said platen.

12. In apparatus for reshaping and compressing plantation cotton bales, the combination of a fixed wall constituting the rear of the compress box, gates constituting the front of the compress box, a platen movable within said box, and ejecting means carried by said platen.

13. In apparatus for reshaping and compressing plantation cotton bales, the combination of a compress box having a fixed wall, hinged gates constituting the front of said box, a movable platen, ejector levers carried by said platen and means adapted to engage the free ends of said levers for tilting them to eject the bale, as the platen descends.

14. In apparatus for reshaping and compressing plantation cotton bales, the combination of a compress box having a fixed rear wall, hinged gates constituting the front of said box, a movable platen, ejector levers carried by said platen, and movable means adapted to engage said levers for tilting them whereby the bale will be ejected.

15. In apparatus for reshaping and compressing plantation cotton bales, the combination of a compress box, gates constituting the front of said box, a fixed platen, a movable platen, means for feeding bale bands into the press chamber adjacent the fixed platen, means for carrying said bands down to rest adjacent the movable platen, and yielding means for throwing the buckle end of the bands forwardly under the fixed platen.

In testimony whereof, I have signed this specification in the presence of two subscribing witnesses.

JOHN L. SHEPPARD.

Witnesses:
GEORGE F. DOWNING,
R. S. FERGUSON.